Oct. 27, 1925.
M. LOMBARDI
1,558,992
VALVE
Filed Jan. 29, 1924
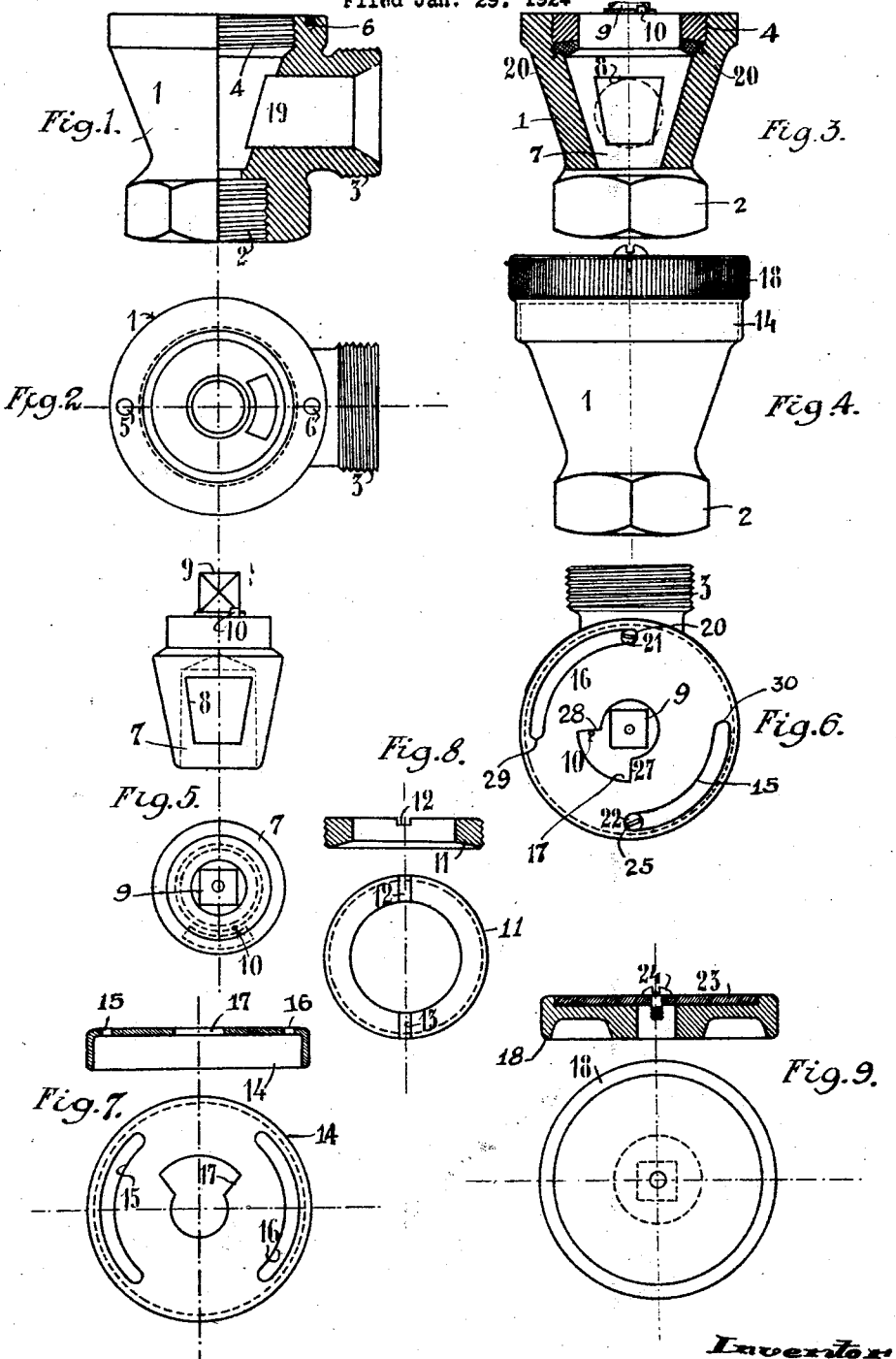
Inventor
M. Lombardi
By Marks & Clerk attys.

Patented Oct. 27, 1925.                                                           1,558,992

UNITED STATES PATENT OFFICE.

MARIO LOMBARDI, OF NAPLES, ITALY.

VALVE.

Application filed January 29, 1924.   Serial No. 689,353.

*To all whom it may concern:*

Be it known that I, MARIO LOMBARDI, a subject of the King of Italy, residing at Naples, Italy, have invented a new and useful Valve, of which the following is a specification.

The cock forming the object of the present invention consists of the following members or parts, viz: a body, a central plug, a ring, an adjusting cover, a hand wheel.

The cock is illustrated in the accompanying drawing, in which:

Fig. 1 is a partly sectional side view,
Fig. 2 a top view,
Fig. 3 a sectional view made on a plan normal to that of the section shown in Fig. 1, but showing the plug in its place,
Fig. 4 is a side view corresponding to the position of Fig. 1,
Fig. 5 shows the plug in a side and top view,
Fig. 6 is a view corresponding to Fig. 2, but having the cover mounted on its place,
Fig. 7 shows this cover,
Fig. 8 is the packing pressing sleeve,
Fig. 9 is the hand wheel.

The body of the cock has preferably the form shown in the drawing and is made with an internal threaded part 2 by which the cock is fixed to the hot water or steam conduit, and an external thread 3 for fixing it on the radiator.

The internal chamber of the body of the cock 1 is such as to be adapted to tightly receive the conical plug. The upper part of the body is made with the threads 4 and the two small threaded holes 5 and 6.

The plug 7 is conical as shown in the drawing; it is hollow and has a trapezoidal opening 8, and its stem 9 is square in section in order to fit the hand wheel. The said plug is also supplied with a small stud 10 on its upper surface.

The pressing ring 11 is made with two small grooves 12 and 13 for the screwing key.

The cover 14 is supplied with two arc-shaped slots 15, 16 and with a central opening 17.

When mounting the cock, the plug 7 is first put into its seat in the body 1, a leather washer 20 being set into the resulting annular groove. The pressing ring is then inserted and tightly screwed home, in order to press on the washer and prevent leakage of water or steam from the lower chamber. The cover 14 is then put into its place, care being taken that the small stud 9 enters into the central opening 17. This will have for consequence that the cuts 15, 16 will be in correspondence with the holes 5, 6 of the body, in which screws 21, 22 are set serving to fix the cover in its right position. The hand wheel 18 is finally fit on the square part 9 of the plugs stem to which it is fixed by means of the screw 24 and the washer 23.

The adjustment of the cock is obtained in a very simple way as follows: It must be noted first of all that, in order to go from the conduit to the radiator, the water or steam pass through the plug 7 and from the opening 8 of said plug to the opening 19 of the part 3 of the body 1. When the cover 14 is mounted on its place, the angular rotation of the plug will be limited by the stud 10 to the width of the opening 17, which permits the said plug to rotate a fourth of a circle, which will be always the same whichever the position of the cover 14. This arrangement will therefore render impossible to force the cock one direction or the other beyond the said limit. When the cover 14 is so adjusted that the ends 25, 26 of the cuts 15, 16 will be in contact with the screws 22, 21 respectively—and that the latter are screwed down well home—the cock plug will be free to rotate of one fourth of a circle and will allow a full passage to the water through the opening 8 which will find itself in perfect and complete correspondence with the opening 19 in the body 1. On turning now the hand wheel, the plug will rotate until the stud 10 contacts with the end 28 of the opening 17, when the passage of the heating means will be completely stopped.

Should, on the contrary, the cover be so fixed that the screws 21, 22 contact with the ends 29, 30 of the cuts 15, 16 respectively, then, when turning the plug, the openings 8 and 19 will be prevented from coming one opposite the other, and the hot water or steam will not be allowed to pass on to the radiator.

If however the cover 14 is fixed in any other intermediary position whatever, the plug will always be able to rotate one fourth of a circle, but the openings 8 and 19 will only partially correspond to one another, so that the passage of the water or steam will partially be cut. This allows to originally set the cock on the most suitable position with regard to the heating effect, and, once such right position of the cover found out, the screws 21, 22 must be screwed home, and the hand wheel put into its place in which it will completely conceal the upper part of the cover 14 with its screws, so that it will be impossible to alter the adjustment. The partial or full rotation of the hand wheel one side or the other will then be enough for regulating the heating according to need.

Having so fully specified and illustrated the nature of my invention and in what manner it must be performed in order to obtain the results it aims at, I now declare that what I claim is:

1. A valve including a tubular body provided with an opening in its wall, a plug in the body having a passageway adapted to lead fluid from the interior of the body to said opening, said plug having a stem and a stop pin projecting beyond one end of the body, a cover arranged at the same end of the body and provided with arc-shaped slots, fastening elements passing through the slots and extending into the body for adjustably holding the cover in position, said cover having an opening to receive the stem of the plug and the cover also having stop surfaces arranged to contact with the stop pin on the plug for limiting the rotation of the latter, and a handle arranged on the stem in close proximity to the cover and covering the cover to prevent any one from tampering with the fastening elements without first removing the handle.

2. A valve including a tubular body having a portion of its bore of conical shape and provided with a port leading from said bore to the exterior of the body, a plug having a frustro-conical portion fitting in the conical portion of the body and provided with a passageway for leading fluid from the bore to said port, said plug also having a cylindrical portion and a stem, the body having internal screw-threads at its upper end, a washer arranged between the body and plug, a threaded ring surrounding the cylindrical portion of the plug, engaging said threads on the body and bearing against the washer, a cover fitting on one end of the body and provided with a central aperture and arc-shaped slots, screws passing through said slots and extending into said body for adjustably holding the cover on the body, said plug having a stop element adapted to contact with certain edges of the aperture in the cover for limiting the rotation of the plug, and a handle fixed on the stem exteriorly of the body and lying sufficiently close to the cover for concealing the latter to prevent said screws from being operated without removing the handle.

In testimony whereof I have signed my name to this specification.

Ing. MARIO LOMBARDI.